US012043200B2

(12) United States Patent
Ohno et al.

(10) Patent No.: US 12,043,200 B2
(45) Date of Patent: Jul. 23, 2024

(54) IN-SEAT AIRBAG DEVICE

(71) Applicant: TOYOTA JIDOSHA KABUSHIKI KAISHA, Toyota (JP)

(72) Inventors: Mitsuyoshi Ohno, Miyoshi (JP); Toshiki Iwama, Toyota (JP); Takeshi Yamamoto, Toki (JP); Masashi Hotta, Gifu-ken (JP); Yoshito Kusuhara, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/122,801

(22) Filed: Mar. 17, 2023

(65) Prior Publication Data
US 2023/0303028 A1    Sep. 28, 2023

(30) Foreign Application Priority Data

Mar. 23, 2022 (JP) .................. 2022-047449

(51) Int. Cl.
*B60R 21/207* (2006.01)
*B60R 21/231* (2011.01)
(Continued)

(52) U.S. Cl.
CPC ...... *B60R 21/23138* (2013.01); *B60R 21/207* (2013.01); *B60R 21/231* (2013.01); *B60R 21/233* (2013.01); *B60R 21/2338* (2013.01); *B60R 21/237* (2013.01); *B60R 2021/0048* (2013.01); *B60R 2021/2074* (2013.01); *B60R 2021/2078* (2013.01);
(Continued)

(58) Field of Classification Search
CPC .. B60R 2021/23146; B60R 2021/2074; B60R 2021/2078; B60R 2021/23386; B60R 2021/23153; B60R 2021/0048; B60R 21/207; B60R 21/2072; B60R 21/23138; B60R 21/233; B60R 21/2338; B60R 21/237; B60R 21/231
USPC ............. 280/729, 730.1, 730.2, 743.1, 743.2
See application file for complete search history.

(56) References Cited

U.S. PATENT DOCUMENTS

| 2006/0131847 A1 | 6/2006 | Sato et al. |
| 2017/0028958 A1 * | 2/2017 | Goto ..................... B60R 21/237 |

(Continued)

FOREIGN PATENT DOCUMENTS

| DE | 102019103484 A1 * | 8/2019 | ....... B60R 21/23138 |
| DE | 102020109466 A1 * | 4/2021 | ........... B60R 21/207 |

(Continued)

*Primary Examiner* — Keith J Frisby
(74) *Attorney, Agent, or Firm* — Dinsmore & Shohl LLP (57) ABSTRACT

An in-seat airbag device, includes: an airbag main body having a front-rear chamber that, due to gas jetted from an inflator, expands past a side of a head of a passenger toward a seat front side and is disposed at the side of the head of the passenger, and a distal end chamber that expands from a seat front side end portion of the front-rear chamber toward a seat width direction inner side and is disposed at a seat front side of a face of the passenger, wherein the airbag main body is accommodated in a state of having an outwardly-wound portion that is wound outwardly in a form of a roll whose axial direction is a seat vertical direction, after a distal end portion of the distal end chamber is folded-over toward a side opposite a passenger side.

19 Claims, 8 Drawing Sheets (51) Int. Cl.
  *B60R 21/233* (2006.01)
  *B60R 21/2338* (2011.01)
  *B60R 21/237* (2006.01)
  *B60R 21/00* (2006.01)

(52) U.S. Cl.
  CPC ............... *B60R 2021/23146* (2013.01); *B60R 2021/23153* (2013.01); *B60R 2021/23386* (2013.01)

(56) References Cited

U.S. PATENT DOCUMENTS

2022/0396233 A1* 12/2022 Ohno .................... B60R 21/207
2023/0311806 A1* 10/2023 Schock ............... B60R 21/2338
  280/743.2

FOREIGN PATENT DOCUMENTS

| JP | 2006-008105 A | | 1/2006 | |
|---|---|---|---|---|
| JP | 2017-197004 A | | 11/2017 | |
| JP | 2019-137307 A | | 8/2019 | |
| KR | 20200141727 A | * | 12/2020 | |
| WO | WO-2017099398 A1 | * | 6/2017 | ............. B60R 21/16 |
| WO | 2019/166268 A1 | | 9/2019 | |

* cited by examiner

IN-SEAT AIRBAG DEVICE

CROSS-REFERENCE TO RELATED APPLICATION

This application is based on and claims priority under 35 USC 119 from Japanese Patent Application No. 2022-047449 filed on Mar. 23, 2022, the disclosure of which is incorporated by reference herein.

BACKGROUND

Technical Field

The present disclosure relates to an in-seat airbag device.

Related Art

There is conventionally known a side airbag device having: an airbag main body portion that, at the time of a collision from an obliquely front side of a vehicle, expands frontward from one side portion of a seatback and is disposed at a side of the upper half (including the head) of the passenger; and an airbag protruding portion that expands from this airbag main body portion toward the seat width direction inner side and is disposed in front of the face of the passenger, wherein these both portions are joined together by a planar tether (see, for example, Japanese Patent Application Laid-Open (JP-A) No. 2006-008105).

However, in an in-seat airbag device that expands at one side and expands from the rear of the head of the passenger and is disposed in front of the face, while restraining the head in the latter half of the collision, the airbag main body rotates around a fixed point, which is at the rear side of the airbag main body, in a direction of moving away from the head of the passenger as seen in plan view, and there is the concern that the head of the passenger will slip out from the airbag main body. As a countermeasure thereto, a structure has been conceived of in which, as seen in plan view, a distal end chamber (corresponding to the aforementioned airbag projecting portion) of the airbag main body is disposed at an acute angle with respect to a front-rear chamber (corresponding to the aforementioned airbag main body portion) of the airbag main body, and a cancelling moment is applied to the airbag main body.

However, in such an airbag main body, if gas flows into the distal end chamber at an early time in the midst of the expanding of the front-rear chamber, the distal end chamber will interfere with (hit) the head of the passenger before the distal end chamber is positioned at the front side of the head (the face) of the passenger, and there is a high possibility that the airbag main body will not be able to expand as planned. In this way, there is room for improvement in a structure that expands an airbag main body of an in-seat airbag device as planned.

SUMMARY

The present disclosure provides an in-seat airbag device that expands an airbag main body as planned.

An in-seat airbag device according to a first aspect relating to the present disclosure includes an airbag main body having a front-rear chamber that, due to gas jetted from an inflator that operates due to a collision of a vehicle being detected or predicted, expands past a side of a head of a passenger toward a seat front side and is disposed at the side of the head of the passenger, and a distal end chamber that expands from a seat front side end portion of the front-rear chamber toward a seat width direction inner side and is disposed at a seat front side of a face of the passenger, wherein the airbag main body is accommodated in a state of having an outwardly-wound portion that is wound outwardly in a form of a roll whose axial direction is a seat vertical direction, after a distal end portion of the distal end chamber is folded-over toward a side opposite a passenger side.

In accordance with the disclosure of the first aspect, when a collision of the vehicle is detected or predicted, the inflator operates and jets-out gas. The front-rear chamber expands past a side of the head of the passenger toward the seat front side, and is disposed at the side of the head of the passenger. The distal end chamber expands from the seat front side end portion of the front-rear chamber toward the seat width direction inner side, and is disposed at a seat front side of the face of the passenger. Here, after the distal end portion of the distal end chamber is folded-over toward the side opposite the passenger side, the airbag main body is wound outwardly in the form of a roll whose axial direction is the seat vertical direction, and is accommodated. Therefore, when gas is jetted out from the inflator, the outwardly-wound portion, which is wound outwardly in the form of a roll, expands while unwinding, and the front-rear chamber is disposed at the side of the head of the passenger. Then, thereafter, the distal end chamber expands from the seat front side end portion of the front-rear chamber toward the seat width direction inner side. Because the distal end portion of the distal end chamber is folded-over toward the side opposite the passenger side, this distal end portion expands the latest. Accordingly, the distal end chamber is, before being positioned at the seat front side of the face of the passenger, prevented from interfering with (hitting) the head of the passenger, and the airbag main body is expanded as planned.

Further, an in-seat airbag device according to a second aspect of the present disclosure is the in-seat airbag device according to the first aspect of the present disclosure, wherein the airbag main body has: an upper tether that joins an expansion direction intermediate portion at an upper end portion of the distal end chamber and an expansion direction intermediate portion at an upper end portion of the front-rear chamber, and a lower tether that joins an expansion direction intermediate portion at a lower end portion of the distal end chamber and an expansion direction intermediate portion at a lower end portion of the front-rear chamber, wherein the distal end portion of the distal end chamber is folded-over along an imaginary straight line that connects the expansion direction intermediate portion to which the upper tether is joined and the expansion direction intermediate portion to which the lower tether is joined.

In accordance with the disclosure of the second aspect, the airbag main body has the upper tether that joins the expansion direction intermediate portion at the upper end portion of the distal end chamber and the expansion direction intermediate portion at the upper end portion of the front-rear chamber, and the lower tether that joins the expansion direction intermediate portion at the lower end portion of the distal end chamber and the expansion direction intermediate portion at the lower end portion of the front-rear chamber. Further, the distal end portion of the distal end chamber is folded-over along an imaginary straight line that connects the expansion direction intermediate portion to which the upper tether is joined and the expansion direction intermediate portion to which the lower tether is joined. Accordingly, it is easy to fold-over the distal end portion of the distal end chamber.

Further, an in-seat airbag device according to a third aspect of the present disclosure is the in-seat airbag device according to the second aspect of the present disclosure, wherein the imaginary straight line extends along the seat vertical direction.

In accordance with the disclosure of the third aspect, the imaginary straight line, which is for folding-over the distal end portion of the distal end chamber, extends along the seat vertical direction. Namely, the upper tether and the lower tether are formed to be the same size. Accordingly, at the time when the head of the passenger moves toward the seat front side due to inertia and is restrained by the airbag main body, the reaction force from the airbag main body is ensured effectively.

Further, an in-seat airbag device according to a fourth aspect of the present disclosure is the in-seat airbag device according to the second aspect of the present disclosure, wherein the imaginary straight line extends along a seat frontward and downward direction.

In accordance with the disclosure of the fourth aspect, the imaginary straight line, which is for folding-over the distal end portion of the distal end chamber, extends along a seat frontward and downward direction. Namely, at the distal end chamber, the expansion direction intermediate portion to which the lower tether is joined is positioned further toward the front side than the expansion direction intermediate portion to which the upper tether is joined, and the lower tether is formed to be smaller than the upper tether. Accordingly, at the time when the head of the passenger moves toward the seat front side due to inertia and is restrained by the airbag main body, the neck of the passenger catching on the lower tether is suppressed.

Further, an in-seat airbag device according to a fifth aspect of the present disclosure is the in-seat airbag device according to any one of the first aspect to the fourth aspect of the present disclosure, wherein the airbag main body has a bellows portion that is folded-up in a form of bellows and is continuous with the outwardly-wound portion at an expansion direction upstream side thereof.

In accordance with the disclosure of the fifth aspect, the airbag main body has the bellows portion that is folded-over in the form of bellows and is continuous with the outwardly-wound portion at the expansion direction upstream side thereof. Therefore, at the airbag main body, first, the bellows portion expands while unfolding, and next, the outwardly-wound portion expands while unwinding. Here, it is known that, generally, a bellows-shaped portion comes undone more quickly than a roll-shaped portion. Accordingly, the airbag main body is expanded more quickly than in a case of having only an outwardly-wound portion.

As described above, in accordance with the present disclosure, an airbag main body can be expanded as planned at an in-seat airbag device.

BRIEF DESCRIPTION OF THE DRAWINGS

Exemplary embodiments of the present disclosure will be described in detail based on the following figures, wherein.

DETAILED DESCRIPTION

Embodiments relating to the present disclosure are described in detail hereinafter on the basis of the drawings. Note that, for convenience of explanation, arrow UP that is shown appropriately in the respective drawings indicates the seat upward direction, arrow FR indicates the seat forward direction, and arrow RH indicates the seat rightward direction. Accordingly, in the following description, when vertical, front-rear and left-right directions are mentioned without being specified, they refer to the vertical, front-rear and left-right of the vehicle seat. Further, the left-right direction has the same meaning as the seat width direction.

Figure 1:
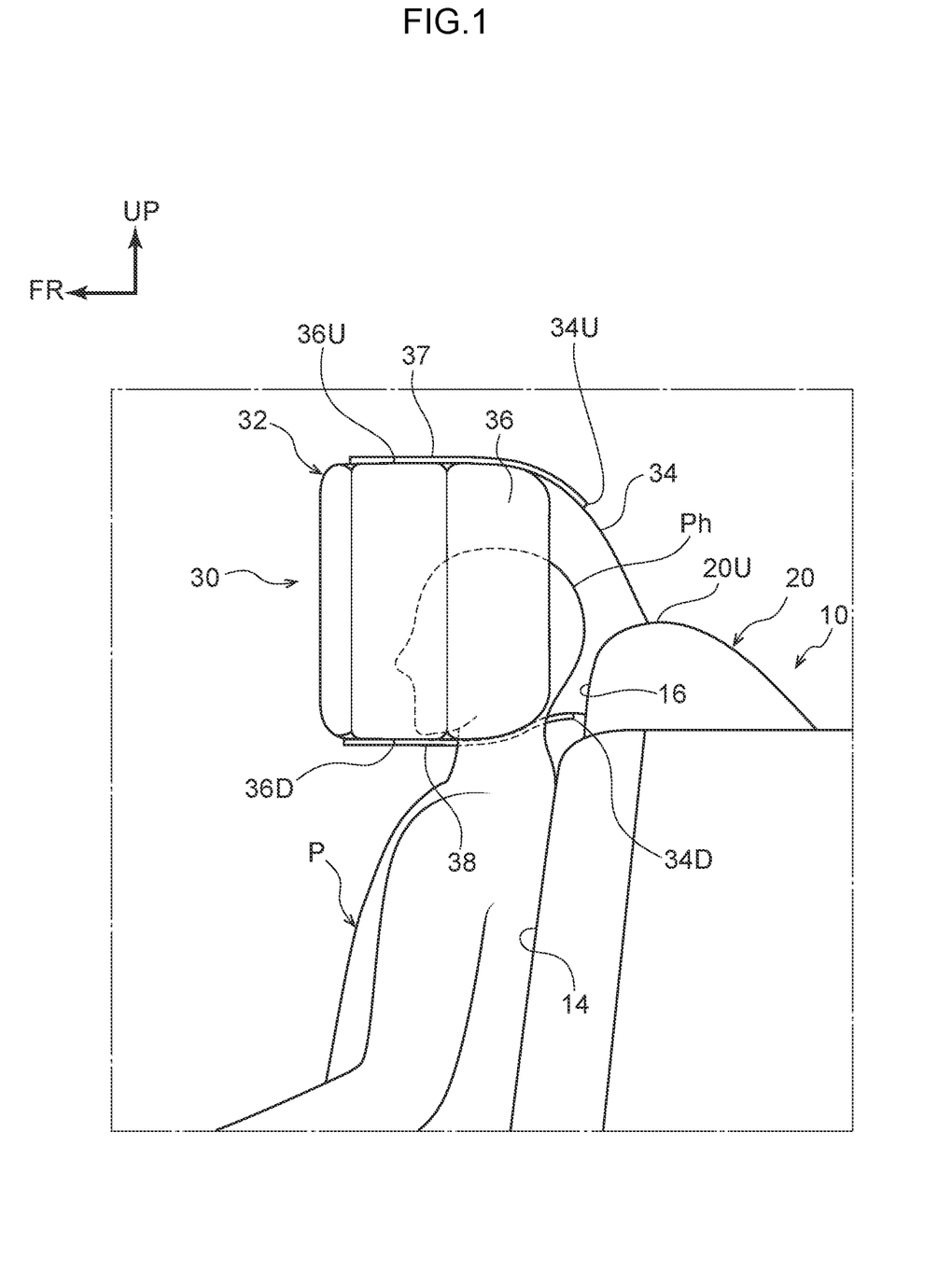
FIG. 1 is a side view illustrating a state after expansion of an in-seat airbag device relating to a first embodiment.
Figure 2:
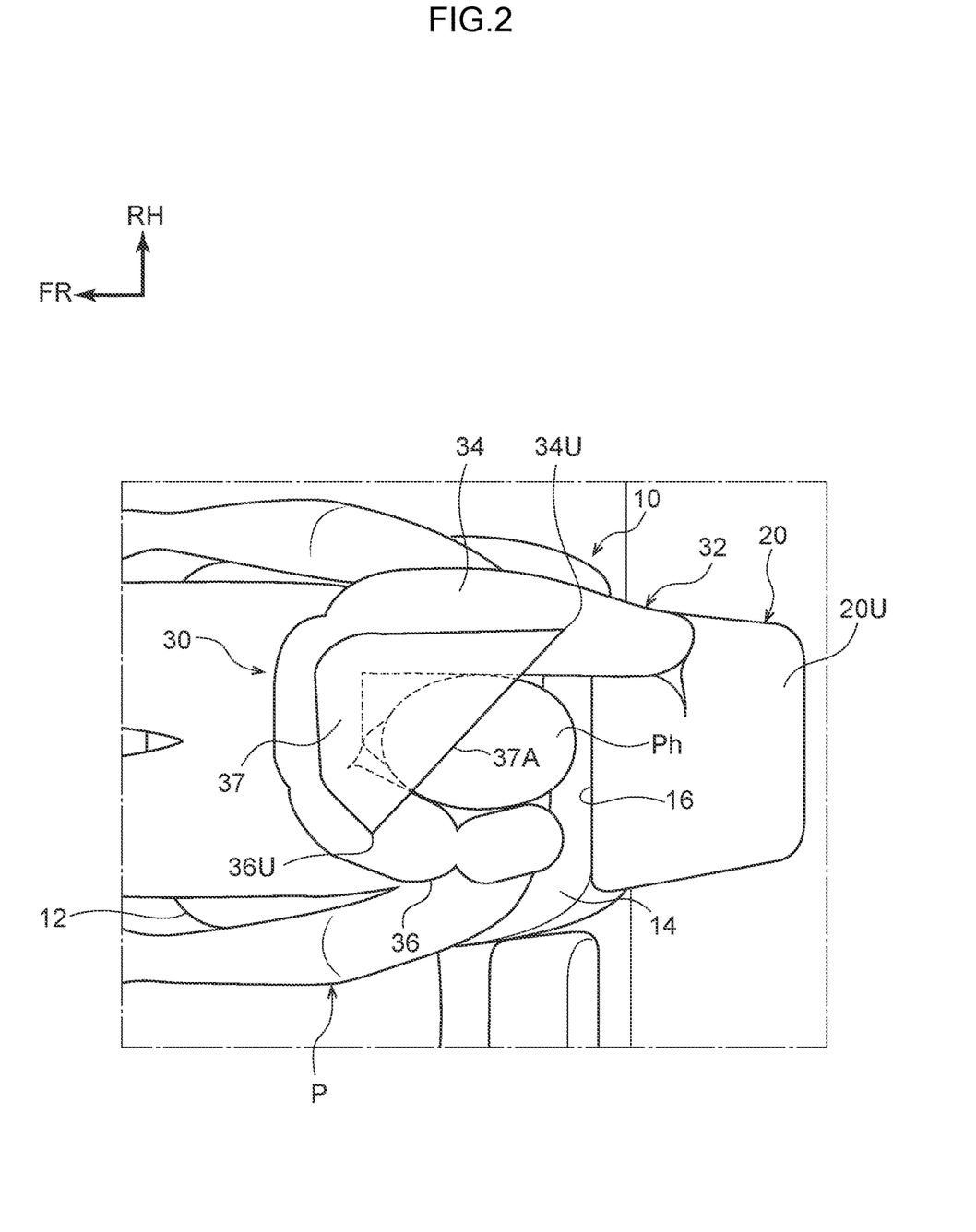
FIG. 2 is a plan view illustrating the state after expansion of the in-seat airbag device relating to the first embodiment.
Figure 3:
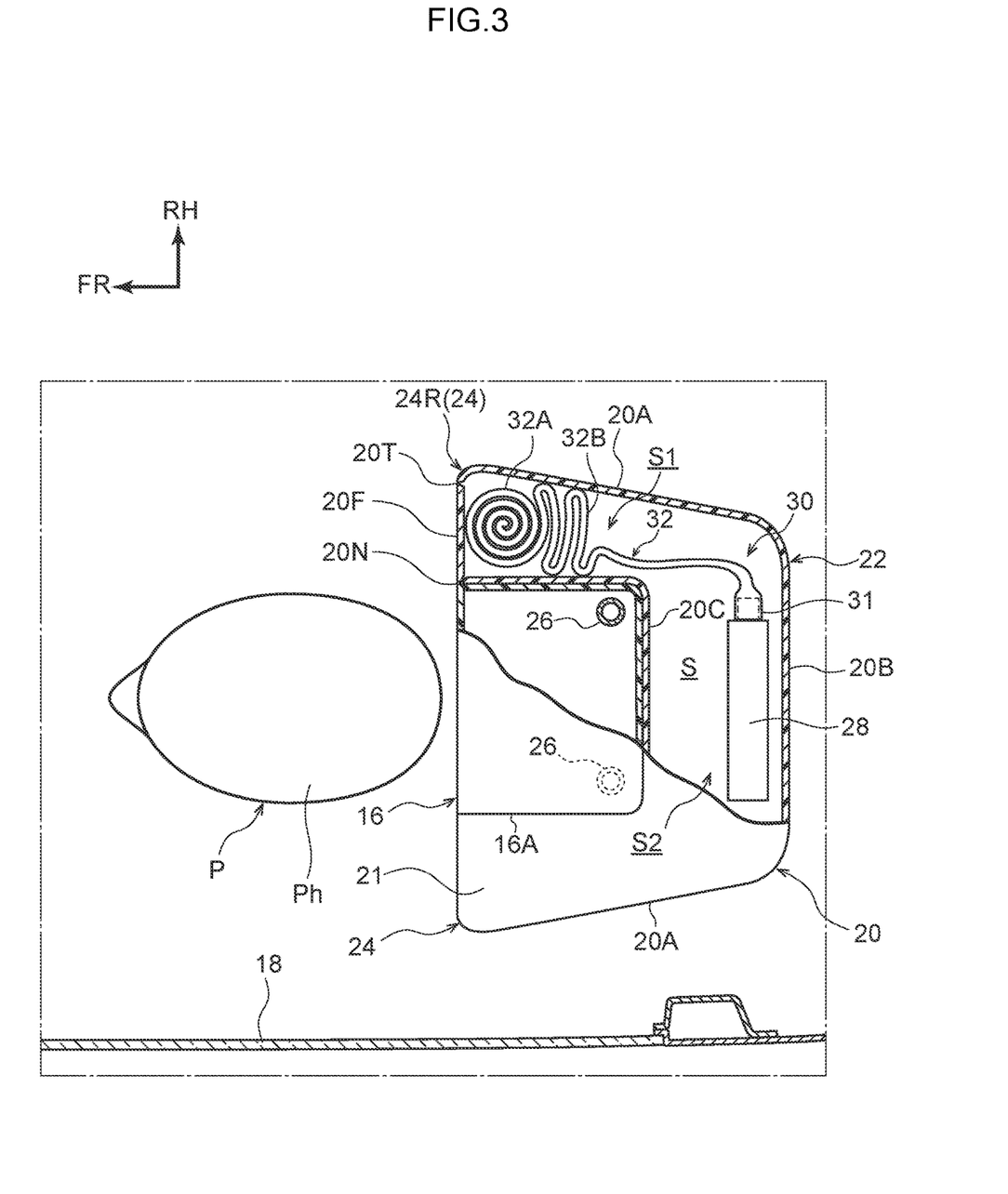
FIG. 3 is an enlarged plan view illustrating, in a partially broken manner, a state before expansion of the in-seat airbag device relating to the first embodiment.

As illustrated in FIG. 1 through FIG. 3, an in-seat airbag device (hereinafter simply called "airbag device") 30 relating to the present embodiment is provided within a case portion 20 that structures a headrest 16 of a vehicle seat 10 that serves as a rear seat of a vehicle. Accordingly, the vehicle seat 10 relating to the present embodiment is described as a rear seat, but the airbag device 30 may be provided at a front seat.

As an example, this rear seat is the rear seat that is at the side of a left side window 18 (see FIG. 3). Further, "passenger P" in the present embodiment is a passenger corresponding to, as an example, an AM50 (50th percentile U.S. adult male) World SID (internationally standardized side crash dummy: World Side Impact Dummy).

First Embodiment

The airbag device 30 relating to the first embodiment is described first. As illustrated in FIG. 1 and FIG. 2, the vehicle seat 10 has a seat cushion 12 on which the passenger P sits (that supports the buttocks and thigh regions of the passenger P), a seatback 14 that supports the back portion of the passenger P, and the headrest 16 that supports a head Ph of the passenger P.

As illustrated in FIG. 3, the headrest 16 has a main body portion 16A that is block-shaped and is provided so as to be able to be raised and lowered at the seat width direction center at the upper end portion of the seatback 14. Specifically, a pair of left and right solid-cylindrical headrest stays (not illustrated) are provided at the seat width direction center of the lower surface of the main body portion 16A.

The respective headrest stays are inserted through headrest supports 26, which are substantially cylindrical and are provided as a left-right pair at the seat width direction center at the upper end portion of the seatback 14, so as to be able to be raised and lowered and so as to be able to be fixed at plural, predetermined positions. Due thereto, the height position of the headrest 16 can be adjusted so as to conform to the position of the head Ph of the passenger P. Further, the headrest 16 has the case portion 20 that is provided so as to be continuous from the rear of the main body portion 16A to over the left and right both sides.

As seen in plan view, the case portion 20 is formed in a substantial "U" shape whose front side is open. The main body portion 16A of the headrest 16 is disposed at the inner side of the case portion 20 substantially without any gaps therebetween. Note that, at the case portion 20, the front end surfaces of left and right side portions 24 that extend in the front-rear direction (i.e., the outer surfaces of front walls 20F) are substantially flush with the front surface of the main body portion 16A.

Further, outer side walls 20A (of the side portions 24) at the left and the right and a rear wall 20B of the case portion 20 are structured by a cover member 22 that is made of resin and is formed in a substantial "U" shape as seen in plan view. Further, an upper wall 20U (see FIG. 1 and FIG. 2), a lower wall (not illustrated), the front walls 20F and an inner peripheral wall 20C, which faces the main body portion 16A, at the case portion 20 are structured to include urethane foam members (not illustrated) of predetermined thicknesses. The cover member 22 and the outer surfaces of the urethane foam members are covered integrally by a skin material 21.

A predetermined space S (including an accommodating portion S1 and a placement portion S2 that are described later) is formed at the interior of the case portion 20. Further, an airbag main body 32 of the airbag device 30 is accommodated in the accommodating portion S1 that is formed within a side portion 24R, which is at the side opposite the side window 18 side (i.e., is at the right side that is the center seat side in the drawings), of the case portion 20.

As illustrated in FIG. 1 and FIG. 2, the airbag device 30 has the airbag main body 32 that expands toward the front side from the rear side (specifically, the rear right side) of the head Ph of the passenger P seated in the vehicle seat 10, due to gas being jetted from an inflator 28 (see FIG. 3) that is described later.

The airbag main body 32 has a front-rear chamber 34 that expands past the right side of the head Ph of the passenger P toward the front side and is disposed at the right side of the head Ph of the passenger P (between the head Ph of the passenger P who is at the side window 18 side and the head of an unillustrated passenger who is at the center seat side), and a distal end chamber 36 that expands from the front side end portion of the front-rear chamber 34 toward the seat width direction inner side and is disposed at the front side of the face of the passenger P and the left side of the head Ph of the passenger P. Namely, this airbag main body 32 is bent in a substantial "J" shape in a bottom view, and can restrain at least the head Ph of the passenger P.

Further, the airbag main body 32 has an upper tether 37 that is in the form of a thin cloth and joins an expansion direction intermediate portion 36U at the upper end portion of the distal end chamber 36 and an expansion direction intermediate portion 34U at the upper end portion of the front-rear chamber 34, and a lower tether 38 (see FIG. 1) that is in the form of a thin cloth and joins an expansion direction intermediate portion 36D (see FIG. 1) at the lower end portion of the distal end chamber 36 and an expansion direction intermediate portion 34D (see FIG. 1) at the lower end portion of the front-rear chamber 34.

More specifically, when the airbag main body 32 inflates and expands, as seen in plan view, the upper tether 37 forms a substantially right triangular shape whose hypotenuse is rear end edge portion 37A that is rectilinear and joins the expansion direction intermediate portion 36U at the upper end portion of the distal end chamber 36 and the expansion direction intermediate portion 34U at the upper end portion of the front-rear chamber 34.

Further, the peripheral edge portion of the upper tether 37, which is other than the rear end edge portion 37A thereof, is attached by sewing to the upper end portion of the front-rear chamber 34 and the upper end portion of the distal end chamber 36, from the expansion direction intermediate portion 34U at the upper end portion of the front-rear chamber 34 to the expansion direction intermediate portion 36U at the upper end portion of the distal end chamber 36.

Similarly, when the airbag main body 32 inflates and expands, as seen in a bottom view, the lower tether 38 forms a substantially right triangular shape whose hypotenuse is the rear end edge portion (not illustrated) that is rectilinear and joins the expansion direction intermediate portion 36D at the lower end portion of the distal end chamber 36 and the expansion direction intermediate portion 34D at the lower end portion of the front-rear chamber 34.

Further, the peripheral edge portion of the lower tether 38, which is other than the rear end edge portion thereof, is attached by sewing to the lower end portion of the front-rear chamber 34 and the lower end portion of the distal end chamber 36, from the expansion direction intermediate portion 34D at the lower end portion of the front-rear chamber 34 to the expansion direction intermediate portion 36D at the lower end portion of the distal end chamber 36.

Note that the upper tether 37 does not interfere with (does not hit) the head Ph of the passenger P because it is positioned at the upper side of the head Ph of the passenger P. Further, although the lower tether 38 is positioned at the neck of the passenger P, because the lower tether 38 is in the form of a thin cloth as described above, even if the lower tether 38 interferes with the neck (hits the neck), the injury value imparted to the neck is low.

As illustrated in FIG. 3, the inflator 28 is disposed in the placement portion S2 that is the rear portion side of the space S formed in the case portion 20. The inflator 28 is formed substantially in the shape of a cylinder having a bottom, and the outer peripheral portion of the inflator 28 is supported via a retainer (not illustrated) at a reaction force plate (not illustrated) that is formed in the shape of a housing, such that the axially central portion of the inflator 28 is disposed along the seat width direction.

The reaction force plate is fixed via a bracket (not illustrated) to the seatback frame (not illustrated) for example, and is structured so as to receive the reaction force that is transmitted via the inflator 28 from the airbag main body 32 that expands toward the front side. Note that the reaction force plate and the retainer are both disposed in the placement portion S2.

The inflator 28 is electrically connected to an airbag ECU (not illustrated) that is provided at the vehicle. The airbag ECU and a detecting device (not illustrated), such as an acceleration sensor or the like provided at the vehicle, are electrically connected. Accordingly, due to a collision of the vehicle being detected by the detecting device, the inflator 28 operates via the airbag ECU, and jets-out gas instantaneously.

Note that the inflator 28 may be a structure that operates due to a collision of the vehicle being predicted by a collision predicting sensor (not illustrated) or the like, and not a structure that operates due to a collision of the vehicle being detected. Further, a connecting portion 31 of the airbag main body 32 is fit with and connected to the jetting port of the inflator 28.

Figure 4:
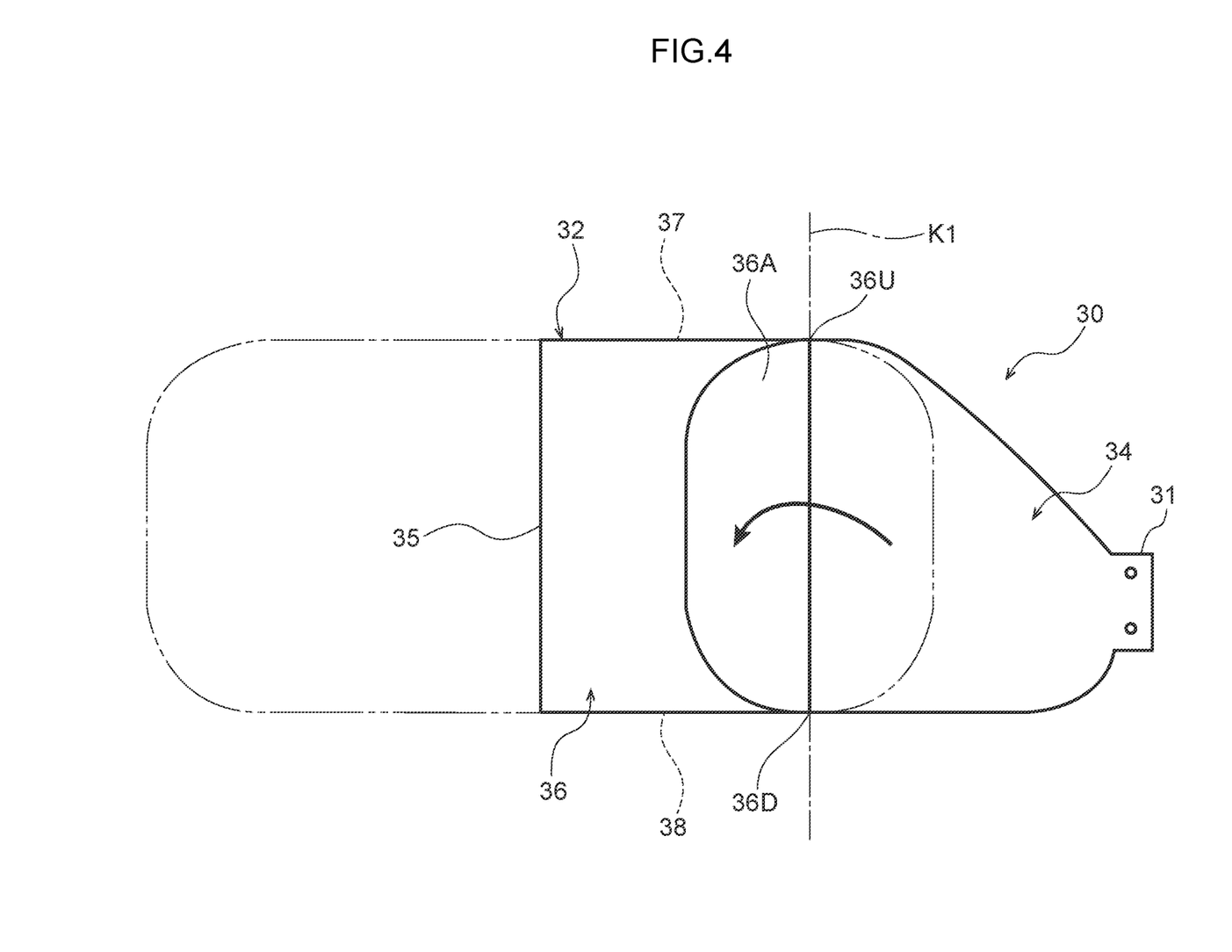
FIG. 4 is a development illustrating a way of folding a distal end chamber of an airbag main body of the in-seat airbag device relating to the first embodiment.

Further, as illustrated in FIG. 4, at the airbag main body 32, a distal end portion 36A of the distal end chamber 36 is folded-over toward the side opposite the passenger P side (toward the side of not contacting the head Ph), and thereafter, as illustrated in FIG. 3, is wound outwardly in the form of a roll whose axial direction is the vertical direction (in a state of having an outwardly-wound portion 32A that is roll-shaped at the seat width direction outer side in plan view), and is accommodated in the accommodating portion S1 formed in the side portion 24R.

More specifically, as illustrated in FIG. 4, the distal end portion 36A of the distal end chamber 36 is folded-over along imaginary straight line K1 that connects the expansion direction intermediate portion 36U to which the upper tether 37 is joined and the expansion direction intermediate portion 36D to which the lower tether 38 is joined (i.e., that extends along the vertical direction). Then, in this state, the airbag main body 32 is wound outwardly in order from the side of a boundary portion 35 between the front-rear chamber 34 and the distal end chamber 36, in the form of a roll whose axial direction is the vertical direction.

Further, as illustrated in FIG. 3, a bellows portion 32B is formed at the expansion direction upstream side of the outwardly-wound portion 32A, so as to be continuous with the outwardly-wound portion 32A. Namely, the airbag main body 32 is accommodated in the accommodating portion S1 in a state of having the bellows portion 32B which is folded-up in the form of bellows and is continuous with the outwardly-wound portion 32A at the expansion direction upstream side thereof.

Figure 5A:
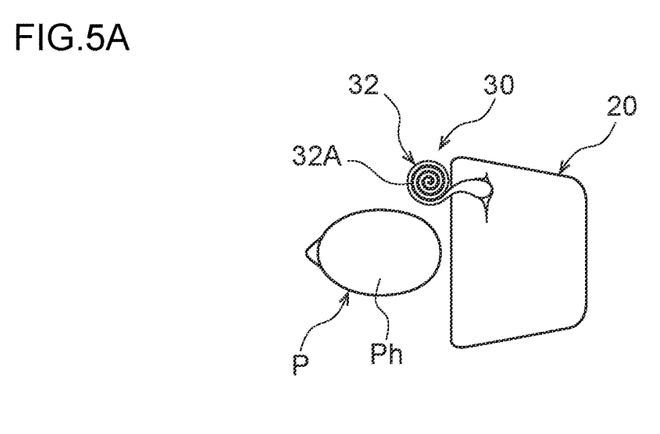
FIG. 5A is a plan view illustrating an expanding processes of the in-seat airbag device relating to the first embodiment.
Figure 5B:
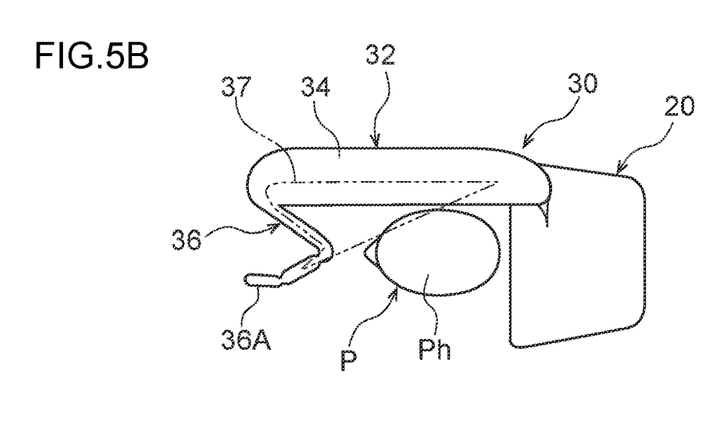
FIG. 5B is a plan view illustrating the expanding processes of the in-seat airbag device relating to the first embodiment.
Figure 5C:
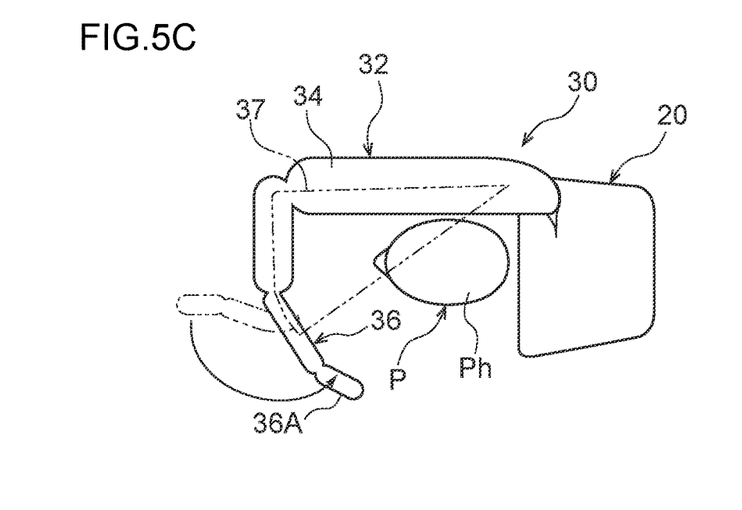
FIG. 5C is a plan view illustrating the expanding processes of the in-seat airbag device relating to the first embodiment.
Figure 5D:
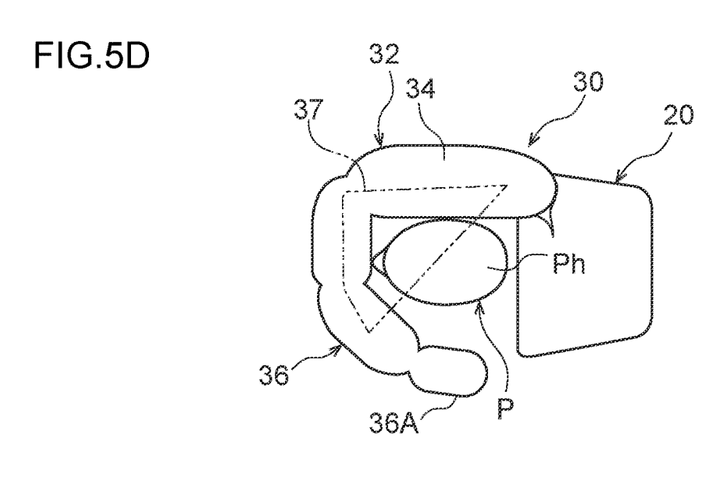
FIG. 5D is a plan view illustrating the expanding processes of the in-seat airbag device relating to the first embodiment.

Accordingly, as illustrated in FIG. 5A and FIG. 5B, at the time when the airbag main body 32 expands from the side portion 24R past the right side of the head Ph of the passenger P toward the front side due to the gas jetted from the inflator 28, first, the bellows portion 32B expands while unfolding, and next, the outwardly-wound portion 32A expands while unwinding.

Note that the bellows portion 32B illustrated in FIG. 3 is formed by two groups, when considering one group to be a region that is folded in two. However, the present disclosure is not limited to this. It suffices for the bellows portion 32B to be formed by plural groups, and the bellows portion 32B may be formed by three or more groups.

Further, accompanying the expansion of the airbag main body 32, the front wall 20F that structures the front end surface of the side portion 24R is, together with a portion of the front wall 20F side of the upper wall 20U, ruptured in the form of a straight line that runs in the vertical direction as seen in a front view for example. In some embodiments, the place that ruptures is preferably a seat width direction inner side end portion 20N of the front wall 20F.

If the place that ruptures is the seat width direction inner side end portion 20N of the front wall 20F (e.g., if a weak portion or the like that is easy to rupture is formed at the seat width direction inner side end portion 20N of the front wall 20F), the front wall 20F opens with a seat width direction outer side end portion 20T being a hinge portion.

Operation of the airbag device 30 relating to the first embodiment that is structured as described above is described next.

When the detecting device detects that the vehicle has front-collided, the inflator 28 operates and instantaneously jets gas into the interior of the airbag main body 32. When gas is jetted to the airbag main body 32 interior, due to the expansion of the airbag main body 32 (i.e., by being pushed from the inner side by the airbag main body 32), the front wall 20F of the side portion 24R ruptures together with a portion of the front wall 20F side of the upper wall 20U.

Then, the airbag main body 32 expands from the side portion 24R past the right side of the head Ph of the passenger P (in the gap between the head Ph of the passenger P at the side window 18 side and the head of the unillustrated passenger at the center seat side) toward the front side. Namely, at the airbag main body 32, first, the bellows portion 32B that is folded-up in a bellows shape expands while unfolding (see FIG. 5A), and next, the outwardly-wound portion 32A that is wound outwardly in the form of a roll expands while unwinding.

Here, it is known that, generally, a bellows-shaped portion comes undone more quickly than a roll-shaped portion (the resistance force at the time of expanding is less at a bellows-shaped portion than at a roll-shaped portion). Accordingly, the airbag main body 32, which has the outwardly-wound portion 32A and the bellows portion 32B in that order from the expansion direction downstream side, can expand toward the front side more quickly than the airbag main body 32 that has only the outwardly-wound portion 32A.

Figure 6A:
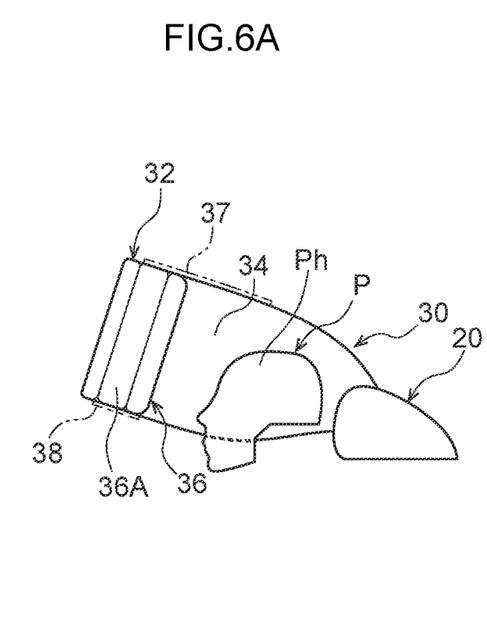
FIG. 6A is a side view corresponding to FIG. 5B and illustrating an expanding process of the in-seat airbag device relating to the first embodiment.
Figure 6B:
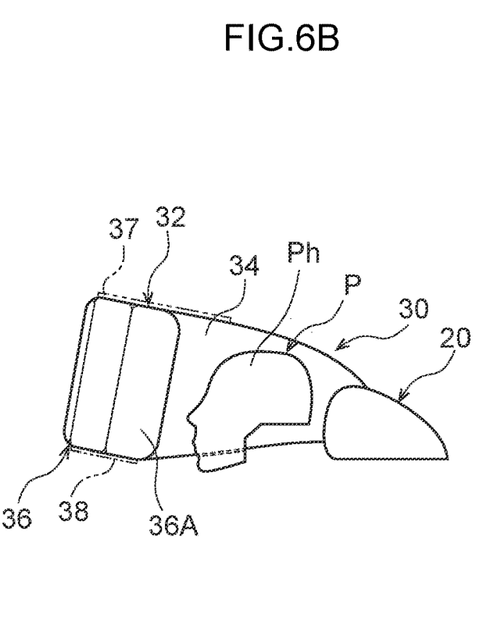
FIG. 6B is a side view corresponding to FIG. 5C and illustrating an expanding process of the in-seat airbag device relating to the first embodiment.
Figure 6C:
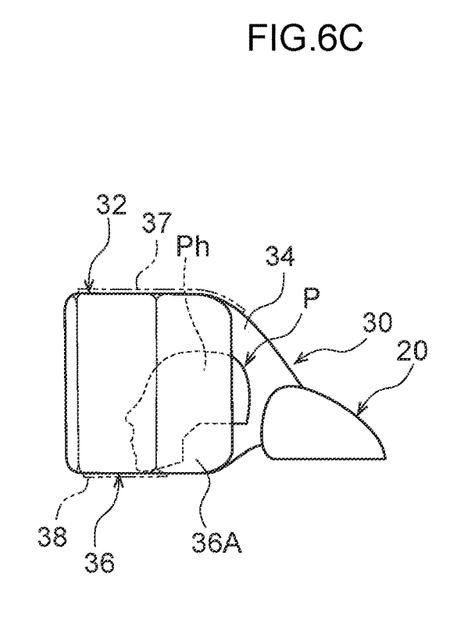
FIG. 6C is a side view corresponding to FIG. 5D and illustrating an expanding process of the in-seat airbag device relating to the first embodiment.

Further, as illustrated in FIG. 5B and FIG. 6A, when the front-rear chamber 34 inflates and expands and is disposed at the right side of the head Ph of the passenger P, gas flows into the distal end chamber 36 from the front side end portion of the front-rear chamber 34, and the distal end chamber 36 inflates and expands toward the seat width direction inner side. At this time, the distal end portion 36A of the distal end chamber 36 is folded-over toward the side opposite the passenger P side.

Accordingly, the distal end portion 36A of the distal end chamber 36 expands the latest. Namely, the distal end portion 36A of the distal end chamber 36 expands after being positioned at the front side of the face of the passenger P. Due thereto, the distal end chamber 36 can be prevented from interfering with (hitting) the head Ph of the passenger P before being positioned at the front side of the face of the passenger P, and the airbag main body 32 can be expanded as planned as illustrated in FIG. 5C, FIG. 6B and FIG. 5D, FIG. 6C.

Further, at least the head Ph of the passenger P seated in the vehicle seat 10 is restrained by the airbag main body 32 (the front-rear chamber 34 and the distal end chamber 36) that has expanded completely. Namely, at least the head Ph of the passenger P moving frontward due to inertia can be suppressed by the airbag main body 32 (the front-rear chamber 34 and the distal end chamber 36).

Note that, as described above, the airbag main body 32 expands toward the front side while the outwardly-wound portion 32A that is wound outwardly unwinds. Therefore, there is no concern that, at the time when the airbag main body 32 expands, the face of the passenger P will be hurt by the airbag main body 32. Moreover, if the front wall 20F is structured so as to be opened with the seat width direction outer side end portion 20T being the hinge portion at the time when the airbag main body 32 expands, the unfolding front wall 20F contacting the head Ph of the passenger P is inhibited by the airbag main body 32.

Further, the distal end portion 36A of the distal end chamber 36 is folded-over along the imaginary straight line K1 that connects the expansion direction intermediate portion 36U to which the upper tether 37 is joined and the expansion direction intermediate portion 36D to which the lower tether 38 is joined. Accordingly, it is easy for the distal end portion 36A of the distal end chamber 36 to be folded-over.

Further, if the imaginary straight line K1 that is for folding-over the distal end portion 36A of the distal end chamber 36 extends along the vertical direction, and the upper tether 37 and the lower tether 38 are formed to be the same size, the reaction force from the airbag main body 32 can be effectively ensured at the time when the head Ph of the passenger P moves toward the front side due to inertia and is restrained by the airbag main body 32.

Second Embodiment

The airbag device 30 relating to a second embodiment is described next. Note that regions that are equivalent to those of the above-described first embodiment are denoted by the same reference numerals, and detailed description thereof (including description of common operations) is omitted appropriately.

Figure 7:
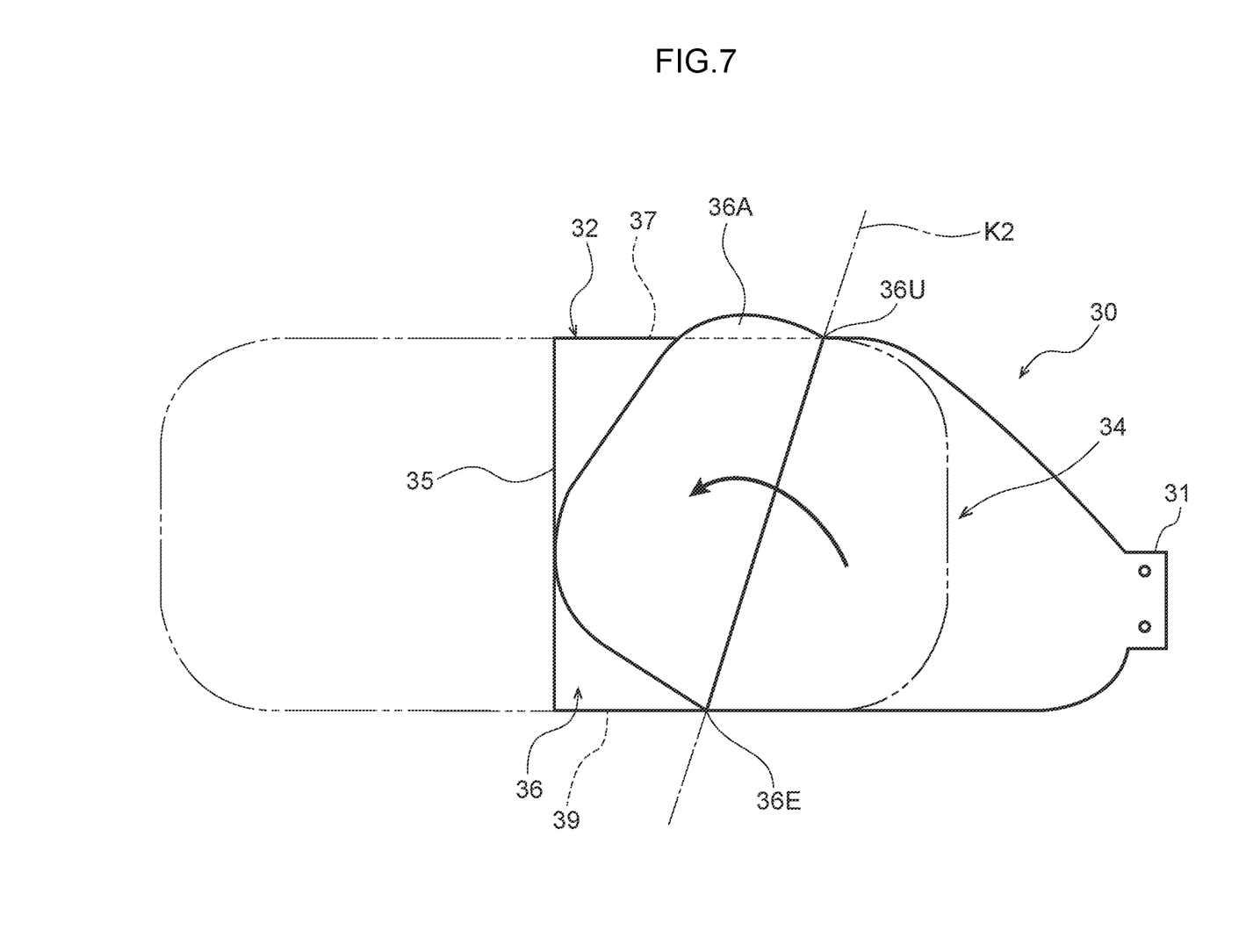
FIG. 7 is a development illustrating a way of folding a distal end chamber of an airbag main body of an in-seat airbag device relating to a second embodiment.
Figure 8A:
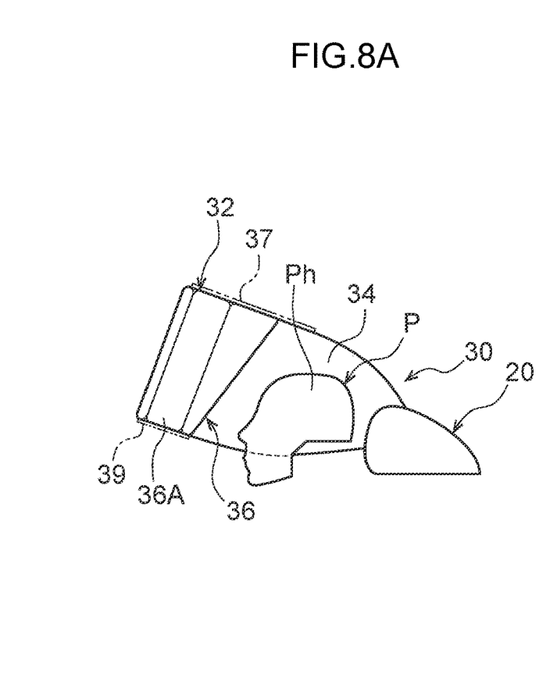
FIG. 8A is a side view corresponding to FIG. 5B and illustrating an expanding process of the in-seat airbag device relating to the second embodiment.
Figure 8B:
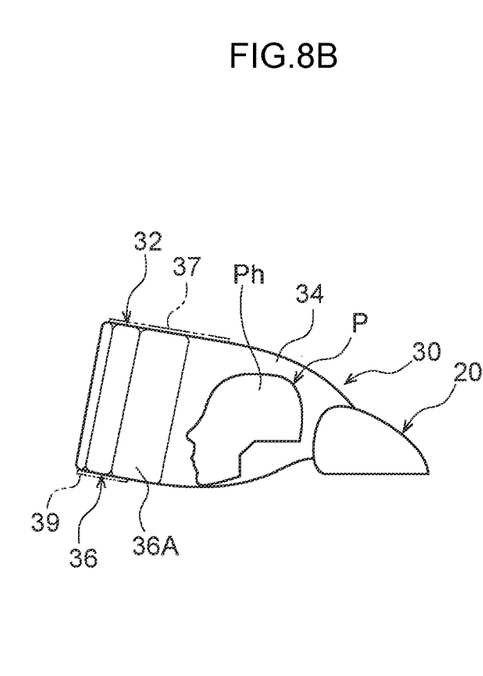
FIG. 8B is a side view corresponding to FIG. 5C and illustrating an expanding process of the in-seat airbag device relating to the second embodiment.
Figure 8C:
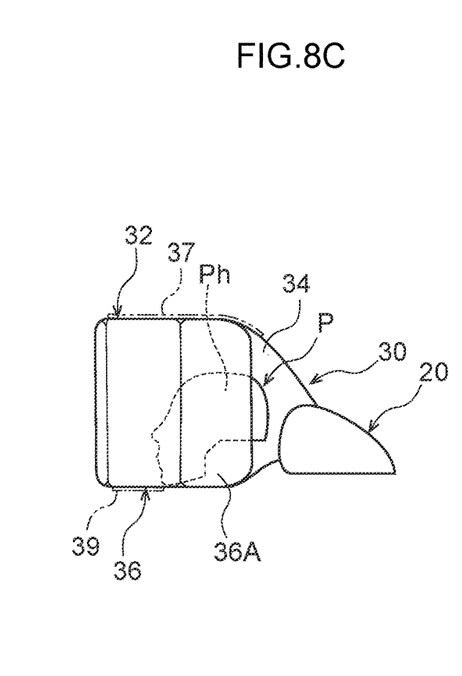
FIG. 8C is a side view corresponding to FIG. 5D and illustrating an expanding process of the in-seat airbag device relating to the second embodiment.

As illustrated in FIG. 7 to FIG. 8C, at the airbag main body 32 of the airbag device 30 relating to the second embodiment, only the shape of a lower tether 39 differs from the above-described first embodiment. Due thereto, only the folded-over portion of the distal end portion 36A of the distal end chamber 36 is different from the above-described first embodiment.

Namely, when the airbag main body 32 inflates and expands, as seen in a bottom view, the lower tether 39 forms a substantially right triangular shape whose hypotenuse is the rear end edge portion (not illustrated) that is rectilinear and joins an expansion direction intermediate portion 36E, which is positioned at the lower end portion of the distal end chamber 36 at further toward the boundary portion 35 side than the expansion direction intermediate portion 36D of the first embodiment, and the expansion direction intermediate portion 34D at the lower end portion of the front-rear chamber 34.

Further, the peripheral edge portion of the lower tether 39, which is other than the rear end edge portion thereof, is attached by sewing to the lower end portion of the front-rear chamber 34 and the lower end portion of the distal end chamber 36, from the expansion direction intermediate portion 34D at the lower end portion of the front-rear chamber 34 to the expansion direction intermediate portion 36E that is positioned further toward the boundary portion 35 side than the expansion direction intermediate portion 36D of the first embodiment at the lower end portion of the distal end chamber 36.

Further, the distal end portion 36A of the distal end chamber 36 at the airbag main body 32 is folded-over toward the side opposite the passenger P side (toward the side of not contacting the head Ph) along imaginary straight line K2 that connects the expansion direction intermediate portion 36U to which the upper tether 37 is joined and the expansion direction intermediate portion 36E to which the lower tether 39 is joined.

Namely, the imaginary straight line K2 for folding-over the distal end portion 36A of the distal end chamber 36 extends in a frontward and downward direction. At the distal end chamber 36, the expansion direction intermediate portion 36E to which the lower tether 39 is joined is positioned further toward the front side than the expansion direction intermediate portion 36U to which the upper tether 37 is joined.

In other words, the lower tether 39 is formed to be smaller than the upper tether 37, and the rear end edge portion, which is rectilinear and joins the expansion direction intermediate portion 36E at the lower end portion of the distal end chamber 36 and the expansion direction intermediate portion 34D at the lower end portion of the front-rear chamber 34, is positioned further toward the front side than in the case of the first embodiment. Accordingly, at the time when the head Ph of the passenger P moves toward the front side due to inertia and is restrained by the airbag main body 32, the neck of the passenger P catching on the lower tether 39 can be suppressed or prevented.

Namely, in the case of the airbag device 30 relating to the second embodiment, even when the airbag main body 32 inflates and expands, the lower tether 39 either does not interfere with (does not hit) the neck of the passenger P, or, if the lower tether 39 does interfere (if it does hit) the neck, the interference is very slight. Accordingly, in accordance with the lower tether 39 of the second embodiment, the injury value that is imparted to the neck of the passenger P can be reduced even more than the lower tether 38 of the above-described first embodiment.

Although the in-seat airbag devices 30 relating to the present embodiments have been described above on the basis of the drawings, the in-seat airbag devices 30 relating to the present embodiments are not limited to the illustrated structures, and the designs thereof can be changed appropriately within a scope that does not depart from the gist of the present disclosure. For example, the reaction force plate that supports the inflator 28 may be fixed to the headrest supports 26 via a bracket, and not to the seatback frame.

Further, the present embodiment describes, as an example, a structure in which the airbag main body 32 inflates and expands from between the head Ph of the passenger P at the side window 18 side and the head of the unillustrated passenger at the center seat side. However, the airbag main body 32 may be structured so as to inflate and expand between the side window 18 and the head Ph of the passenger P.

What is claimed is:

1. An in-seat airbag device comprising:
    an airbag main body including:
        a front-rear chamber that, due to gas jetted from an inflator that operates due to a collision of a vehicle being detected or predicted, is configured to extend past a side of a head of a passenger toward a seat front side and is configured to be disposed at the side of the head of the passenger;
        a distal end chamber that expands from a seat front side end portion of the front-rear chamber toward a seat width direction inner side and is configured to be disposed at a seat front side of a face of the passenger;

an upper tether that joins an expansion direction intermediate portion at an upper end portion of the distal end chamber and an expansion direction intermediate portion at an upper end portion of the front-rear chamber; and a lower tether that joins an expansion direction intermediate portion at a lower end portion of the distal end chamber and an expansion direction intermediate portion at a lower end portion of the front-rear chamber, wherein the airbag main body is accommodated in a state of having an outwardly-wound portion that is wound outwardly in a form of a roll whose axial direction is a seat vertical direction, after a distal end portion of the distal end chamber is folded-over toward a side opposite a passenger side.

2. The in-seat airbag device of claim 1, wherein the distal end portion of the distal end chamber is folded-over along an imaginary straight line that connects the expansion direction intermediate portion to which the upper tether is joined and the expansion direction intermediate portion to which the lower tether is joined.

3. The in-seat airbag device of claim 2, wherein the imaginary straight line extends along the seat vertical direction.

4. The in-seat airbag device of claim 3, wherein the airbag main body has a bellows portion that is folded-up in a form of bellows and is continuous with the outwardly-wound portion at an expansion direction upstream side thereof.

5. The in-seat airbag device of claim 2, wherein the imaginary straight line extends along a seat frontward and downward direction.

6. The in-seat airbag device of claim 5, wherein the airbag main body has a bellows portion that is folded-up in a form of bellows and is continuous with the outwardly-wound portion at an expansion direction upstream side thereof.

7. The in-seat airbag device of claim 5, wherein, at the distal end chamber, the expansion direction intermediate portion to which the lower tether is joined is positioned further toward the front side than the expansion direction intermediate portion to which the upper tether is joined.

8. The in-seat airbag device of claim 5, wherein the lower tether is smaller than the upper tether.

9. The in-seat airbag device of claim 2, wherein the airbag main body has a bellows portion that is folded-up in a form of bellows and is continuous with the outwardly-wound portion at an expansion direction upstream side thereof.

10. The in-seat airbag device of claim 1, wherein at least one of the upper tether or the lower tether is in the form of a thin cloth.

11. The in-seat airbag device of claim 10, wherein, in a plan view, the upper tether forms a substantially right triangular shape having a hypotenuse that is a rectilinear rear end edge portion and joins the expansion direction intermediate portion at the upper end portion of the distal end chamber and the expansion direction intermediate portion at the upper end portion of the front-rear chamber.

12. The in-seat airbag device of claim 11, wherein the upper tether and the lower tether are formed to be the same size.

13. The in-seat airbag device of claim 11, wherein a peripheral edge portion of the upper tether, which is other than the rear end edge portion, is attached by sewing to the upper end portion of the front-rear chamber and the upper end portion of the distal end chamber, from the expansion direction intermediate portion at the upper end portion of the front-rear chamber to the expansion direction intermediate portion at the upper end portion of the distal end chamber.

14. The in-seat airbag device of claim 11, wherein a peripheral edge portion of the lower tether is attached by sewing to the lower end portion of the front-rear chamber and the lower end portion of the distal end chamber, from the expansion direction intermediate portion at the lower end portion of the front-rear chamber to the expansion direction intermediate portion at the lower end portion of the distal end chamber.

15. The in-seat airbag device of claim 10, wherein, in a bottom view, the lower tether forms a substantially right triangular shape whose hypotenuse is a rear end edge portion that is rectilinear and that joins the expansion direction intermediate portion at the lower end portion of the distal end chamber and the expansion direction intermediate portion at the lower end portion of the front-rear chamber.

16. The in-seat airbag device of claim 15, wherein the upper tether and the lower tether are formed to be the same size.

17. The in-seat airbag device of claim 11, wherein a peripheral edge portion of the upper tether is attached by sewing to the upper end portion of the front-rear chamber and the upper end portion of the distal end chamber, from the expansion direction intermediate portion at the upper end portion of the front-rear chamber to the expansion direction intermediate portion at the upper end portion of the distal end chamber.

18. The in-seat airbag device of claim 15, wherein a peripheral edge portion of the lower tether, which is other than the rear end edge portion, is attached by sewing to the lower end portion of the front-rear chamber and the lower end portion of the distal end chamber, from the expansion direction intermediate portion at the lower end portion of the front-rear chamber to the expansion direction intermediate portion at the lower end portion of the distal end chamber.

19. The in-seat airbag device of claim 1, wherein the airbag main body has a bellows portion that is folded-up in a form of bellows and is continuous with the outwardly-wound portion at an expansion direction upstream side thereof.

* * * * *